J. H. CLARK.
Horse-Stalls.

No. 199,411.  Patented Jan. 22, 1878.

Witnesses  
H. E. Briggs

Inventor  
Joseph H. Clark

UNITED STATES PATENT OFFICE.

JOSEPH H. CLARK, OF DEERING, MAINE.

IMPROVEMENT IN HORSE-STALLS.

Specification forming part of Letters Patent No. 199,411, dated January 22, 1878; application filed June 16, 1877.

*To all whom it may concern:*

Be it known that I, JOSEPH H. CLARK, of Deering, in the county of Cumberland and State of Maine, have invented a new and useful Improvement in Horse-Stalls, which improvement is fully set forth in the following specification and accompanying drawing, in which—

Figure 1:
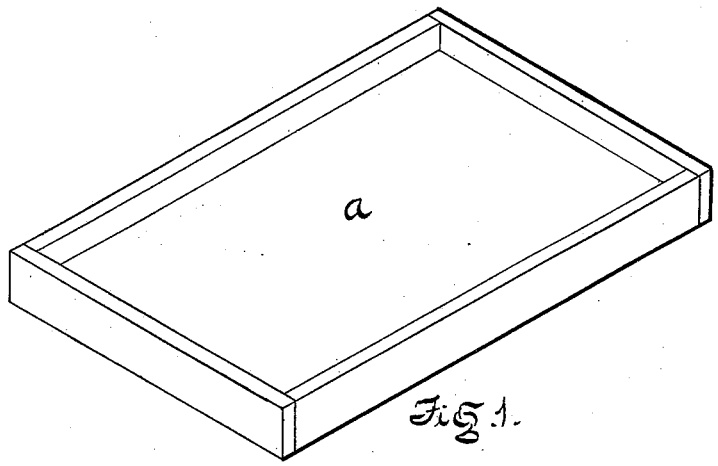
Figure 2:
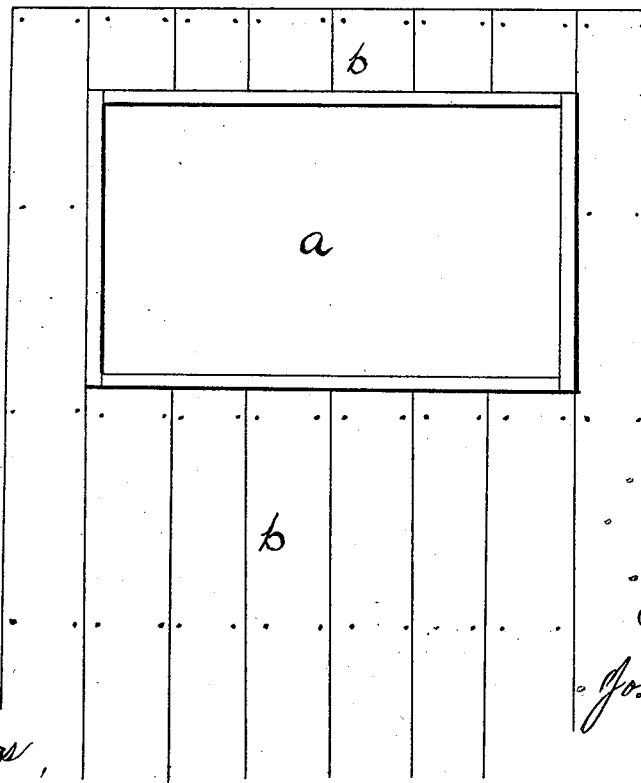

Figure 1 is a perspective view of the earth-box $a$. Fig. 2 is a horizontal view of the earth-box $a$ in position in a section of the floor $b$ of the stall.

The object of my invention is to furnish a device which will relieve the fore feet of the horse in the stall, and prevent injury to the animal that stands on a hard dry floor, by making an earth-box, permanent, convenient, and economical, for the standing of the fore feet.

In the drawings, the box $a$ in Fig. 1 is made of wood, thirty inches long, fifteen inches wide, and two inches deep, more or less, and nailed together strong, and the joints put up with lead and oil, and made water-tight. It may be made of any other material that will do the same work.

The bottom of the box $a$ should be set on firm timber, and made suitable for the floor of the stall.

In Fig. 2 the box $a$ should be twenty-two inches, more or less, from the manger, in the center and lengthwise across the stall, and the edges of the box $a$ should be set level with the floor $b$.

In the use of my device the box $a$ is filled with earth and kept moist for the standing of the fore feet of the horse; and in case the earth is not used for the time, a piece of plank two inches thick, and made to fit the inside of the box $a$, may be used, and thus make the floor $b$ level.

It is obvious that cool earth would be very beneficial to the fore feet of the horse standing in the stall in hot weather.

Having thus described my invention, what I claim as new, and desire to secure by Letters Patent, is—

The water-tight earth-box $a$, in combination with the stall-floor $b$, substantially as shown and described.

JOSEPH H. CLARK.

Witnesses:
    ANDREW J. CHASE,
    WM. ALLEN, Jr.